(No Model.)
T. LUMSDON.
VEHICLE SPRING.
No. 308,846. Patented Dec. 2, 1884.
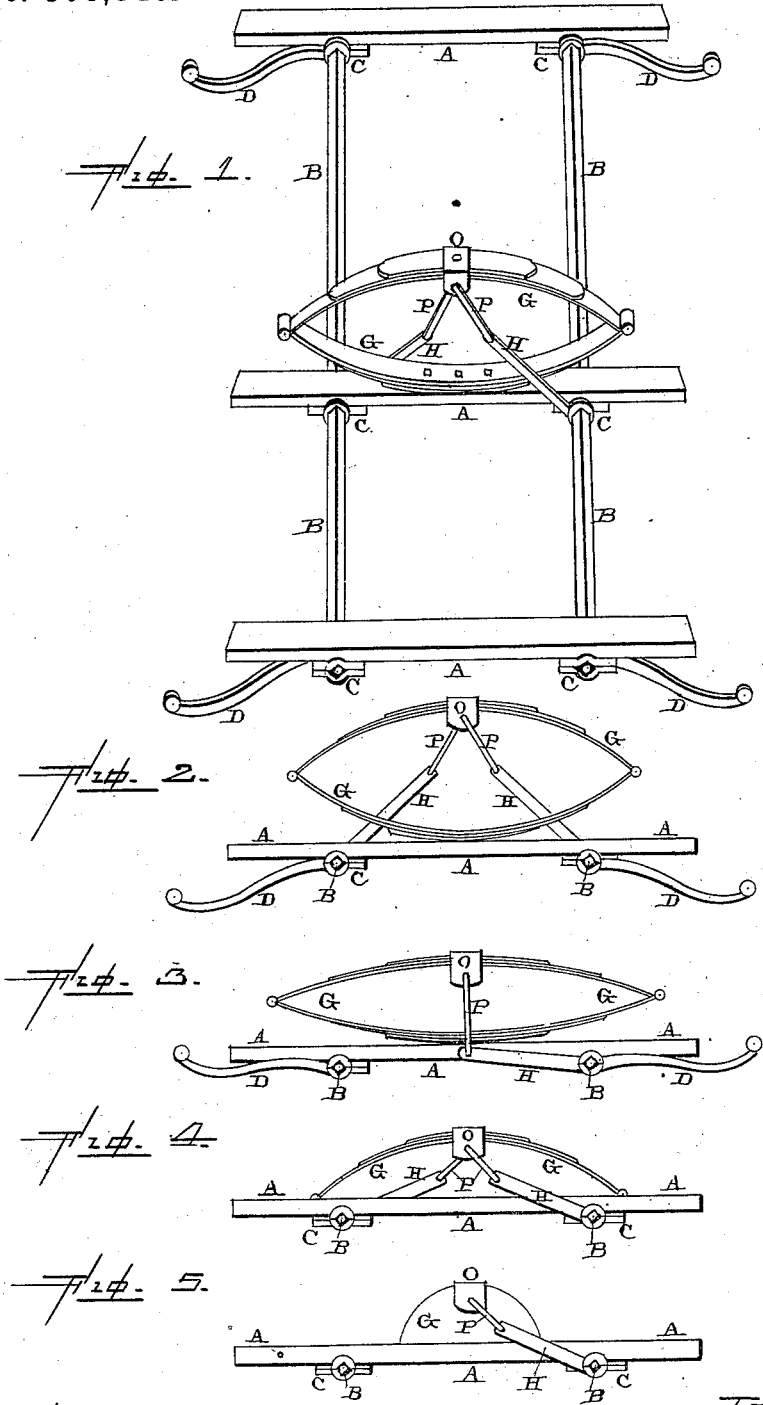

UNITED STATES PATENT OFFICE.

THOMAS LUMSDON, OF MARION, VIRGINIA.

VEHICLE-SPRING.

SPECIFICATION forming part of Letters Patent No. 308,846, dated December 2, 1884.

Application filed June 6, 1884. (No model.)

*To all whom it may concern:*

Be it known that I, THOMAS LUMSDON, of Marion, in the county of Smythe and State of Virginia, have invented certain new and useful Improvements in Equalizing Vehicle-Springs; and I do hereby declare the following to be a full, clear, and exact description of the invention, such as will enable others skilled in the art to which it pertains to make and use it, reference being had to the accompanying drawings, which form part of this specification.

My invention relates to an improvement in equalizing vehicle-springs; and it consists in the combination of the partially-revolving steel or iron bars, arms which are rigidly secured to the bars at their inner ends, and connected to the vehicle-body at their outer ones, arms which are secured to the bars at their outer ends and connected to the spring at their inner ones, cross-bars, and spring, all of which will be more fully described hereinafter.

The object of my invention is to connect both of the equalizing-bars to the spring in such a manner that the movement of any of the parts must of necessity be transferred equally to all of the others, and thus produce an easy-riding movement.

Figure 1 is a perspective of a spring embodying my invention. Figs. 2 and 3 are end views of the same, showing the parts in different positions. Figs. 4 and 5 show springs which are specially adapted for heavy vehicles.

A represents suitable cross-bars, upon which the body of the vehicle rests, and to the under sides of which the boxes C, for the partially-revolving bars B, are secured. These bars, which may be made of either iron or steel, turn freely back and forth in the boxes, and have rigidly secured to their ends the arms D.

The outer ends of these arms D are loosely fastened to the side bars of the vehicle; or, if no side bars are used, then to the scrolls set on the gear for this special purpose.

The central cross-bar is placed directly under the seat of the vehicle, and on this cross-bar is placed a spring, G, either of the form shown in Figs. 1, 2, 3, or any other that may be preferred.

Secured rigidly to the bars B are the two arms H, which project inwardly, and are connected to the saddle O on the spring by means of the connecting-rods P. When the outer ends of the arms D are depressed, as shown in Fig. 2, the spring rises upward to its full height, but in proportion as the outer ends of the arms are raised upward, as shown in Fig. 3, the spring is compressed. Any movement of one of the parts is necessarily communicated to the others, and hence a very pleasant and easy-riding motion is produced.

Where the vehicle is large and heavy, only one-half of a spring should be used, and where a cheap form of spring is wanted it may be formed from a rubber block, as shown in Fig. 5.

Having thus described my invention, I claim—

The combination of the two end cross-bars, A, provided with the boxes C, the rods B, journaled in the boxes, the arms or levers D, for connection to the body of the vehicle, the arms H, rods P, and the spring G, placed upon a central cross-bar, also provided with boxes, substantially as shown.

In testimony whereof I affix my signature in presence of two witnesses.

THOMAS LUMSDON.

Witnesses:
S. L. WALTHALL,
T. MARION ANDERSON.